United States Patent
Redd et al.

(10) Patent No.: US 6,224,289 B1
(45) Date of Patent: May 1, 2001

(54) POWER TAKEOFF UNIT-DRIVEN UNIT ADAPTER WITH SUMP LUBRICATION

(76) Inventors: Kevin D. Redd, 923 River Bend Rd.; Randall H. Redd, 8359 Dawsonville Hwy., both of Dawsonville, GA (US) 30534

( * ) Notice: Subject to any disclaimer, the term of this patent is extended or adjusted under 35 U.S.C. 154(b) by 0 days.

(21) Appl. No.: 09/216,306

(22) Filed: Dec. 18, 1998

(51) Int. Cl.[7] .................................................. F16N 1/00
(52) U.S. Cl. ............................................................ 403/337
(58) Field of Search .................................... 403/3, 4, 337, 403/335

(56) References Cited

U.S. PATENT DOCUMENTS

| | | |
|---|---|---|
| 2,735,281 * | 2/1956 | Hubert et al. . |
| 2,851,896 * | 9/1958 | Ordway . |
| 3,724,598 * | 4/1973 | Smith ..................................... 184/6.1 |
| 4,026,186 * | 5/1977 | Williams, Jr. et al. .................. 85/68 |
| 4,066,048 * | 1/1978 | Premus .................................. 403/3 X |
| 4,121,532 * | 10/1978 | Coryell, III ....................... 403/337 X |
| 4,272,224 | 6/1981 | Kabele .................................. 417/360 |
| 4,281,942 * | 8/1981 | Gaeckle et al. ......................... 403/38 |
| 4,356,889 * | 11/1982 | Teeter ................................... 184/6.12 |
| 4,425,817 * | 1/1984 | Wells et al. ............................. 74/467 |
| 4,572,682 | 2/1986 | Iwata .................................. 400/144.2 |
| 4,610,175 * | 9/1986 | Weis et al. ........................... 74/15.86 |
| 4,660,425 * | 4/1987 | Nerstad et al. ...................... 74/15.86 |
| 4,685,341 * | 8/1987 | Tanaka et al. ....................... 74/15.82 |
| 4,773,277 * | 9/1988 | Cook et al. ............................. 74/377 |
| 4,811,614 * | 3/1989 | Lasoen ................................. 74/15.63 |
| 4,813,290 * | 3/1989 | Hone .................................... 74/15.88 |
| 5,163,335 * | 11/1992 | Isom et al. ............................ 403/3 X |
| 5,228,355 * | 7/1993 | Smith et al. ............................. 74/467 |
| 5,299,880 * | 4/1994 | Bouchard ................................. 403/3 |
| 5,566,591 * | 10/1996 | Burkett ................................. 403/3 X |
| 5,645,363 | 7/1997 | Dafforn et al. .......................... 403/3 |
| 6,036,452 * | 3/2000 | Huang ............................... 403/337 X |
| 6,073,517 * | 6/2000 | Pauwels et al. ..................... 403/3 X |

* cited by examiner

*Primary Examiner*—Anthony Knight
*Assistant Examiner*—John R. Cottingham
(74) *Attorney, Agent, or Firm*—Kenneth S. Watkins, Jr.

(57) ABSTRACT

An adapter for attaching a PTO unit to a driven unit comprises an internal lubrication sump. The sump provides lubrication for the shaft coupling between the PTO unit and the driven unit. The sump is sealed from the PTO unit by sealing surfaces on the PTO fastener holes and a sealed receiving surface for a PTO shaft seal. The sump is sealed with the driven unit by a sealing surface on the driven end of the adapter. Multiple PTO fastener holes and lubricant fill ports allow several mounting positions of the adapter with respect to the driven unit.

7 Claims, 5 Drawing Sheets

POWER TAKEOFF UNIT-DRIVEN UNIT ADAPTER WITH SUMP LUBRICATION

BACKGROUND OF THE INVENTION

The present invention relates to adapters for connection of drive units and driven units and, more particularly, to adapter units for connection of power takeoff units and driven units such as pumps or generators.

There are numerous applications of auxiliary equipment on vehicles such as trucks, tractors and construction and delivery vehicles requiring drive power. So-called power takeoff (PTO) units are commonplace due to several advantages over separate power sources for the auxiliaries. PTO units eliminate the need for separate auxiliary drives such as gasoline or diesel engines, or electric motors and their associated operation and maintenance problems. PTO units are compact and lower in cost to purchase and operate as compared to separate auxiliary power sources. They are also rugged and save time as compared to separate auxiliary drive sources.

Some applications utilizing PTO drive units have experienced problems associated with coupling failures between the PTO unit and the driven unit or accessory. Physical interferences between the driven unit and other equipment or obstructions on the vehicle require less than ideal drive arrangements and drive alignments. High drive loads and severe operating conditions such as temperature extremes, vibration and other loads add to the coupling reliability problems. Coupling failures often lead to failures in the PTO or driven unit itself resulting in costly repairs. Adapters which connect the PTO to the driven unit add mounting flexibility compared to directly connected equipment, but can exacerbate shaft coupling problems.

OBJECTS AND SUMMARY OF THE INVENTION

Therefore an object of the present invention is to provide an adapter for connecting a driven unit to a power takeoff unit which increases reliability and lifetime of the components and overcomes the problems of earlier designs.

A further object of the present invention is to provide an adapter for connecting a driven unit to a PTO unit which provides constant lubrication to the shaft coupling between the PTO shaft and the driven unit shaft.

A further object of the present invention is to provide an adapter for connecting a driven unit to a PTO unit which provides lubricant seals to fully seal an internal lubricant cavity or sump enclosing the shaft coupling.

Yet another object of the present invention is to provide an adapter for connecting a driven unit to a PTO unit which provides a lubricant sump sufficiently sealed to permit use of a lubricant of low enough viscosity to allow free flow of the lubricant at normal operating temperatures.

The adapter of the present invention comprises a body defining an internal cavity. The body has an open PTO end which is connected to the PTO unit and an open driven unit end connected to the driven unit. The addition of the PTO unit and driven unit at the ends of the adapter form a lubrication sump with the internal cavity of the adapter body. Fastener holes in the PTO end of the adapter are sealable to prevent loss of lubricant from the sump. A seal surface on the driven unit end of the adapter seals the adapter and the driven unit, preventing loss of lubricant from the sump. A shaft seal, held and sealed with the adapter by a receiving surface in the PTO end of the adapter, seals the shaft of the PTO where the shaft enters the PTO end of the adapter.

A plurality of PTO end fastener holes allows the adapter to be rotated with respect to the adapter axis to reduce interferences encountered during mounting of the driven unit to the adapter. In the preferred embodiment, PTO fastener end holes are sealed by a seal surface surrounding the fastener hole which seal to the fastener head on the inside of the adapter body, or a resilient washer inserted over the fastener. The unused PTO fastener holes are sealed either by plugs, or by not through-drilling the holes during the assembly process. A resilient seal such as a gasket or "O"-ring seal seals between the driven end seal surface of the adapter and the driven unit.

A lubricant port and port plug in the body of the adapter allows filling the lubrication sump. At least two lubrication ports allows filling and draining lubricant regardless of the radial installed position of the adapter.

Brief Description of the Drawings

These and other features, aspects and advantages of the present invention will become better understood with regard to the following description, appended claims and accompanying drawings where:

DESCRIPTION OF THE PREFERRED EMBODIMENTS

The following is a description of the preferred embodiments of an adapter for connecting a driven unit to a power takeoff unit (PTO). The adapter provides continuous shaft coupling lubrication.

Figure 1:
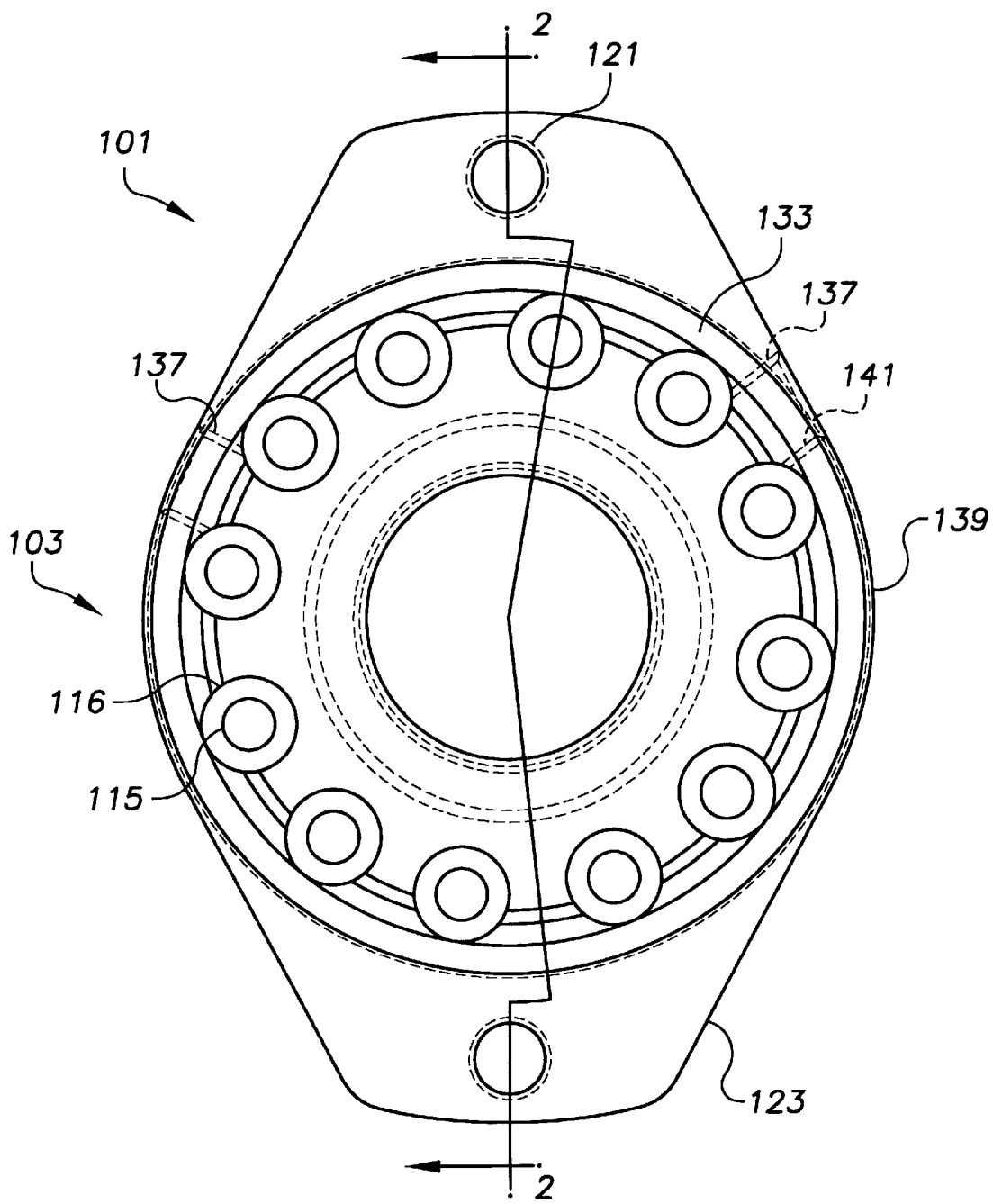
FIG. 1 is a front elevation drawing of a PTO-driven unit adapter of the present invention, looking from the driven unit end.
Figure 2:
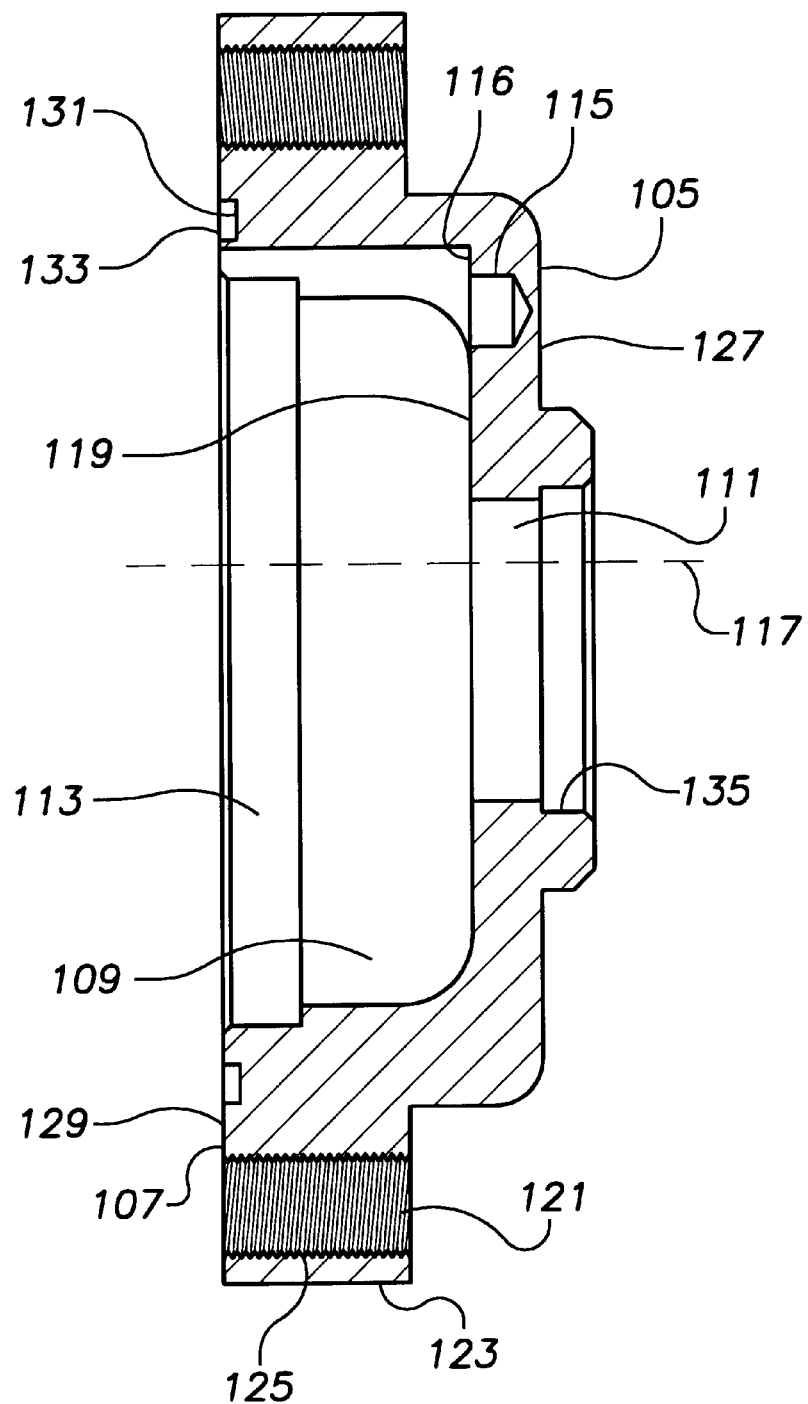
FIG. 2 is a cross-sectional drawing of the adapter of FIG. 1 taken along lines 2—2 of FIG. 1.

FIG. 1 is a front elevation view of embodiment 101 of the PTO-driven unit adapter looking into the driven unit end. FIG. 2 is a cross-section drawing of adapter 101 taken through lines 2—2 of FIG. 1.

Adapter 101 comprises a body 103 having a first or PTO end 105 and a second or driven unit end 107. Body 103 which, in the preferred embodiment is generally cylindrical in shape, defines an internal cavity 109 having a first or PTO end opening 111 and a second or driven unit end opening 113.

Adapter 101 comprises a plurality of first or PTO fastener holes 115 spaced radially about axis 117. In the preferred embodiment, the number of fastener holes 115 is equal to a multiple of the number of complementary fastener holes (403 of FIG. 4) on a PTO unit (303 of FIG. 3) as discussed in following sections. FIG. 2 shows the location of 12 fastener holes 115 of embodiment 101.

In the one embodiment, holes 115 are non-through holes extending from inside surface 119 of PTO end 105 and open to internal cavity 109. Holes required for attachment to PTO unit 303 are through-drilled when the adapter is readied for use as discussed in following sections. A first lubricant seal surface 116 surrounds each of the PTO fastener holes 115 on inside surface 119.

Figure 3:
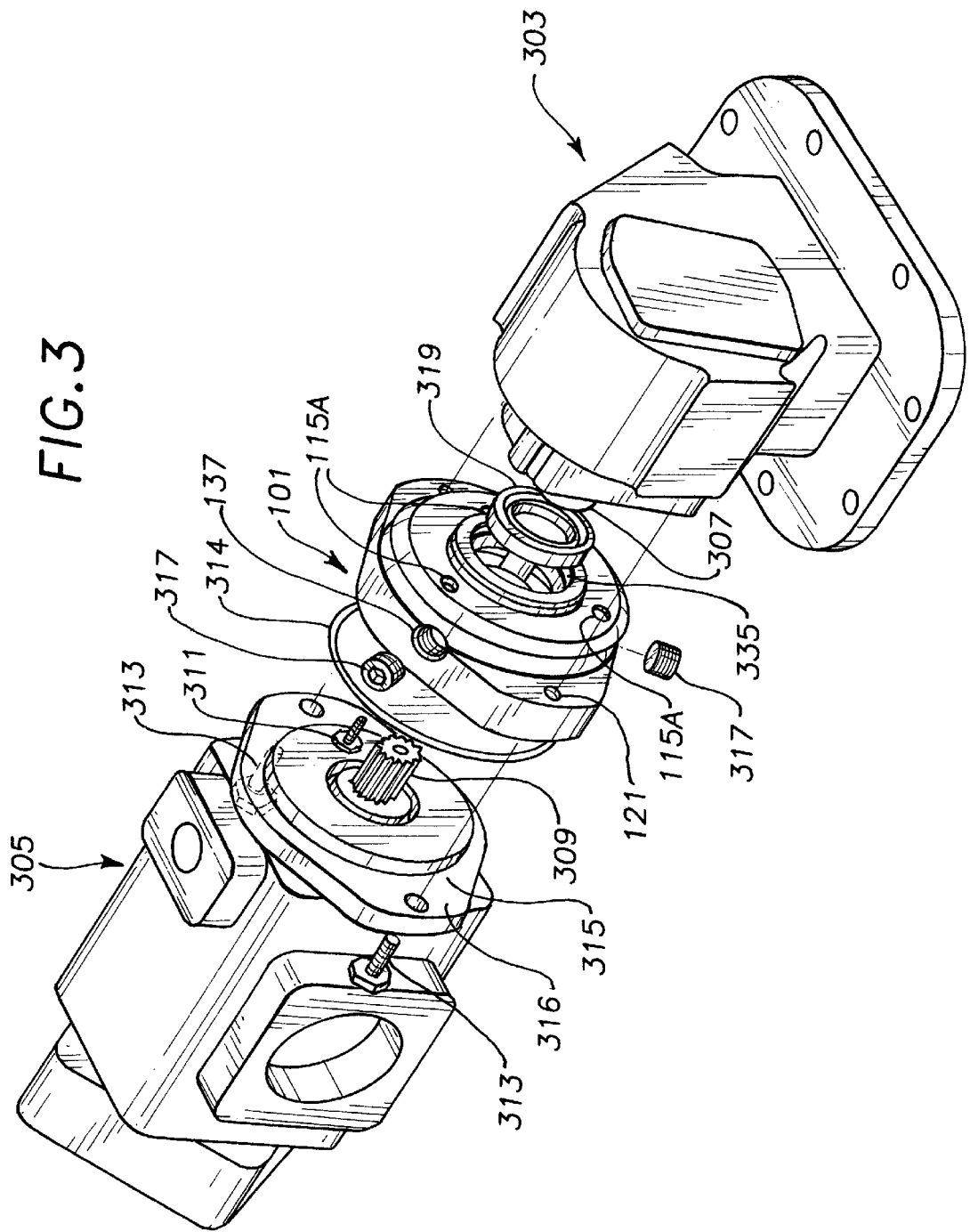
FIG. 3 is an exploded assembly drawing of the adapter of FIGS. 1 and 2, showing assembly with a PTO unit, a driven unit, a PTO shaft seal, a driven unit "O"-ring seal, and fasteners to attach the PTO unit and the driven unit to the adapter.

Driven unit fastener holes 121 on body 103 provide an attachment means for driven unit 305 of FIG. 3. In one embodiment, driven unit fastener holes 121 extend from driven unit end 107 and may be located on a driven unit mounting flange 123 attached to body 103. In the preferred embodiment, driven unit fastener holes 121 comprise internal threads 125 for engagement to fasteners 313 of FIG. 3.

PTO end 105 comprises a PTO mount surface 127 for mounting to complementary surface (421 of FIG. 4) on PTO 303. Driven unit end 107 comprises a mount surface 129 for mounting to complementary surface or driven unit flange (316 of FIG. 3). Mount surface 129 of driven unit end 107 comprises a second lubricant seal surface such as surface 131 of "O"-ring groove 133.

PTO end 105 comprises a shaft seal receiving surface 135 at PTO end opening 111. Lubricant ports 137 extend from outside surface 139 of body 103 to internal cavity 109. In the preferred embodiments, lubrication ports 137 comprises engagement threads 141 to engage lubrication port threaded caps 317 of FIG. 3.

FIG. 3 is an exploded drawing of adapter 101 of FIGS. 1 and 2 for assembly with a PTO unit 303 and a driven unit 305 such as a pump. PTO unit 303 provides power to driven unit 305 through internal splined shaft 307. Driven unit 305 receives power through external splined shaft 309. PTO fastener holes 115A are holes selected from PTO fastener holes 115 of FIG. 1 and are through-drilled prior to assembly. Holes 115A are selected to align with complementary PTO fastener holes 403 in PTO 303. In the preferred embodiment, holes 115A are unthreaded and the complementary holes in PTO 303 (403 of FIG. 4) are threaded. PTO fasteners 311 fasten adapter 101 to PTO 303 at mount surface 127. Only one PTO fastener 311 is shown to improve clarity of FIG. 3.

In one embodiment, three PTO fasteners are utilized to attach adapter 101 to PTO unit 303. The twelve non-through-drilled PTO fastener holes 115 of FIG. 1 allow the user to select three spaced holes (as in 115A of FIG. 3) which provide the desired radial mount position. The radial mount position may be selected as required to avoid interferences in mounting the adapter and driven unit. The user simply completes the through drilling of the selected fastener holes and assembles the unit as depicted in FIG. 3.

Use of non-through-drilled holes 115 provides several advantages over templates or all through-drilled holes. The non-through-drilled holes provide a more effective seal than plugged through-drilled holes. The partially-drilled holes selected for drilling require less time to drill than that required for template-marked locations. And, hole location accuracy is improved for field-drilled holes which are partially drilled as compared to fully drilled holes from markings or templates.

Driven unit fasteners 313 fasten adapter 101 to driven unit 305 at mount surface 129 of FIG. 2. "O"-ring 314, inserted in "O"-ring groove 133, seals mount surface 129 of adapter 101 to complementary mount surface 315 of driven unit 305. Lubrication port plugs 317, threaded into lubrication ports 137 seal ports 137. Shaft seal 319, inserted over shaft 307 of PTO 303 and retained on shaft seal receiving surface 135 seals shaft 307.

Figure 4:
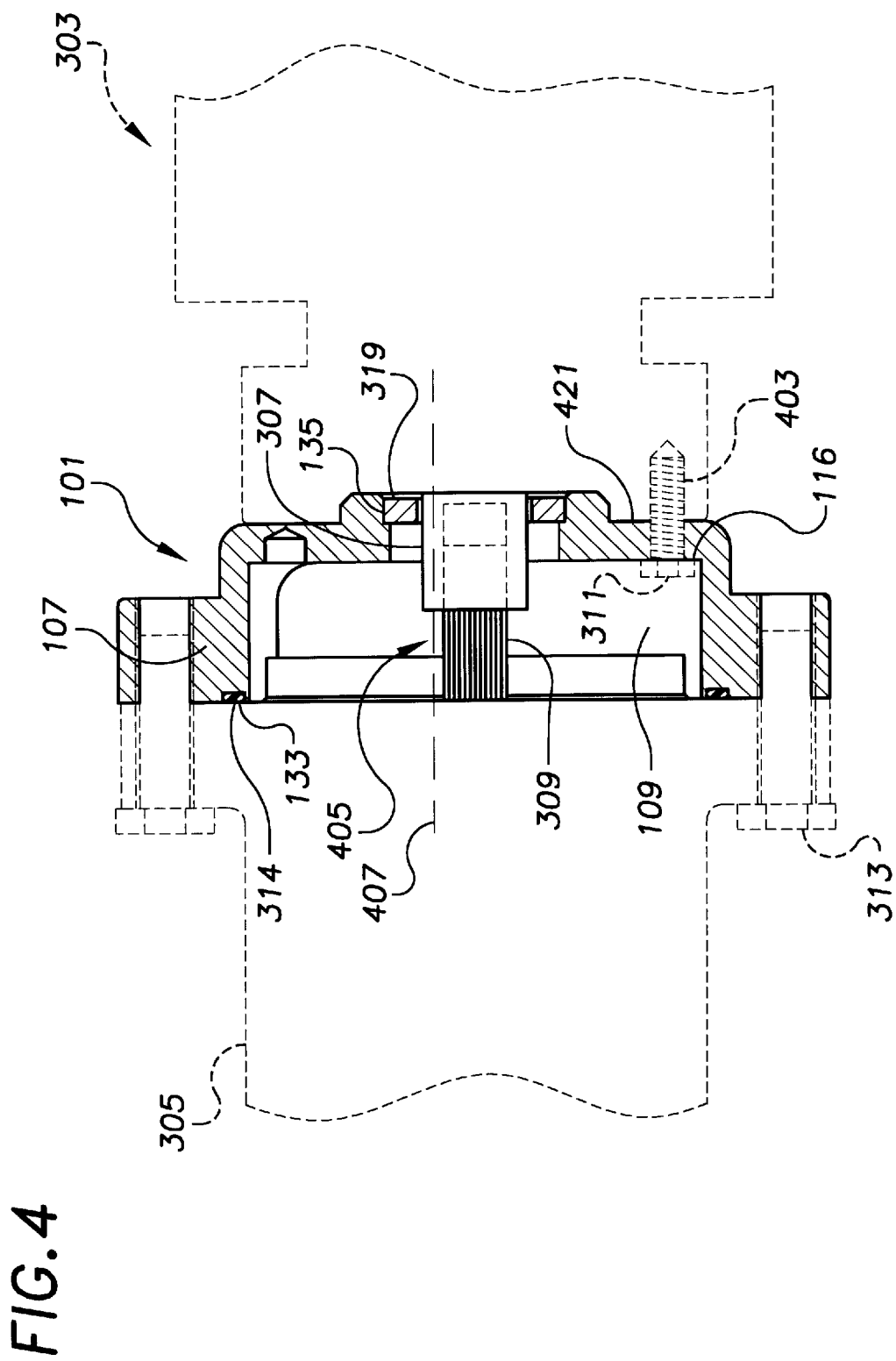
FIG. 4 is a partial cross-section drawing showing the completed assembly of the PTO unit and driven unit to the adapter, forming an enclosed lubricant sump from the internal cavity of the adapter.

FIG. 4 is a partial cross-section drawing of adapter 101 assembled to and connecting PTO 303 to driven unit 305. PTO fasteners 311 fasten adapter 101 to PTO 303. Fasteners 313 fasten adapter 101 to driven unit 305. Lubricant seal surface 116 seals PTO fastener 311 head to adapter 101. "O"-ring seal 314 in groove 133 seals driven unit end 107 of adapter 101 to driven unit 305. Shaft seal receiving surface 135 seals shaft seal 319 to adapter 101 and shaft seal 319 seals internal cavity 109 from PTO shaft 307.

PTO shaft 307 drives driven unit shaft 309 though the coupling provided by internal splines on PTO shaft 307 and external splines on driven unit shaft 309. The seals of adapter 101 provide sealing or enclosure of internal cavity 109 and allow a lubricant such as oil to be added to constantly lubricate shaft coupling 405. Lubricant level line 407 ensures that coupling 405 is constantly lubricated, by partially submerging the coupling in lubricant. In other embodiments, lubricant fully covers coupling 405. Other liquid lubricants such as mineral oil or synthetic lubricants may be used to lubricate coupling 405. High viscosity lubricants such as grease may also be used, but are less effective that lubricants having a viscosity low enough to allow free flowing of the lubricant at operating temperatures. Other shaft couplings may be used such as gear couplings, flexible couplings, universal couplings and spring couplings.

Figure 6:
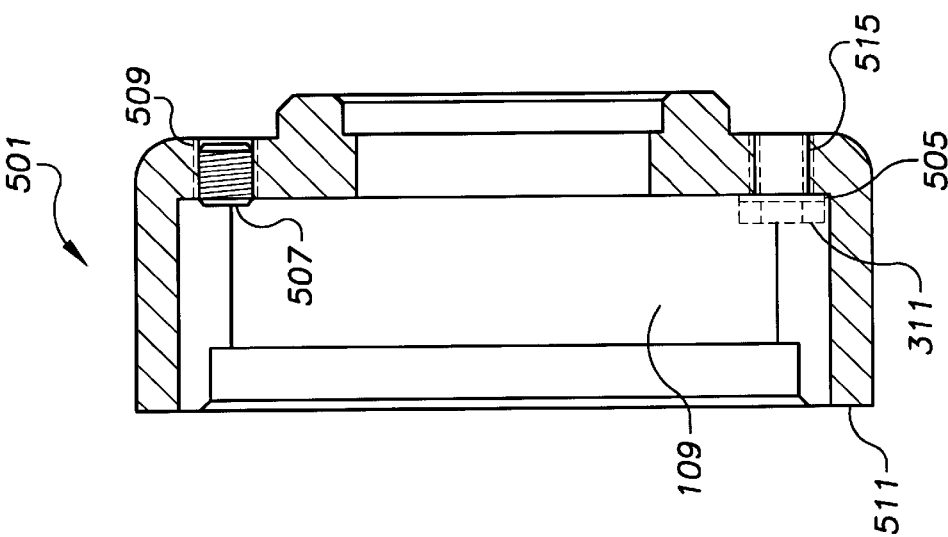
FIG. 6 is a cross-sectional drawing of the adapter of FIG. 5 taken along lines 6—6 of FIG. 5.
Figure 5:
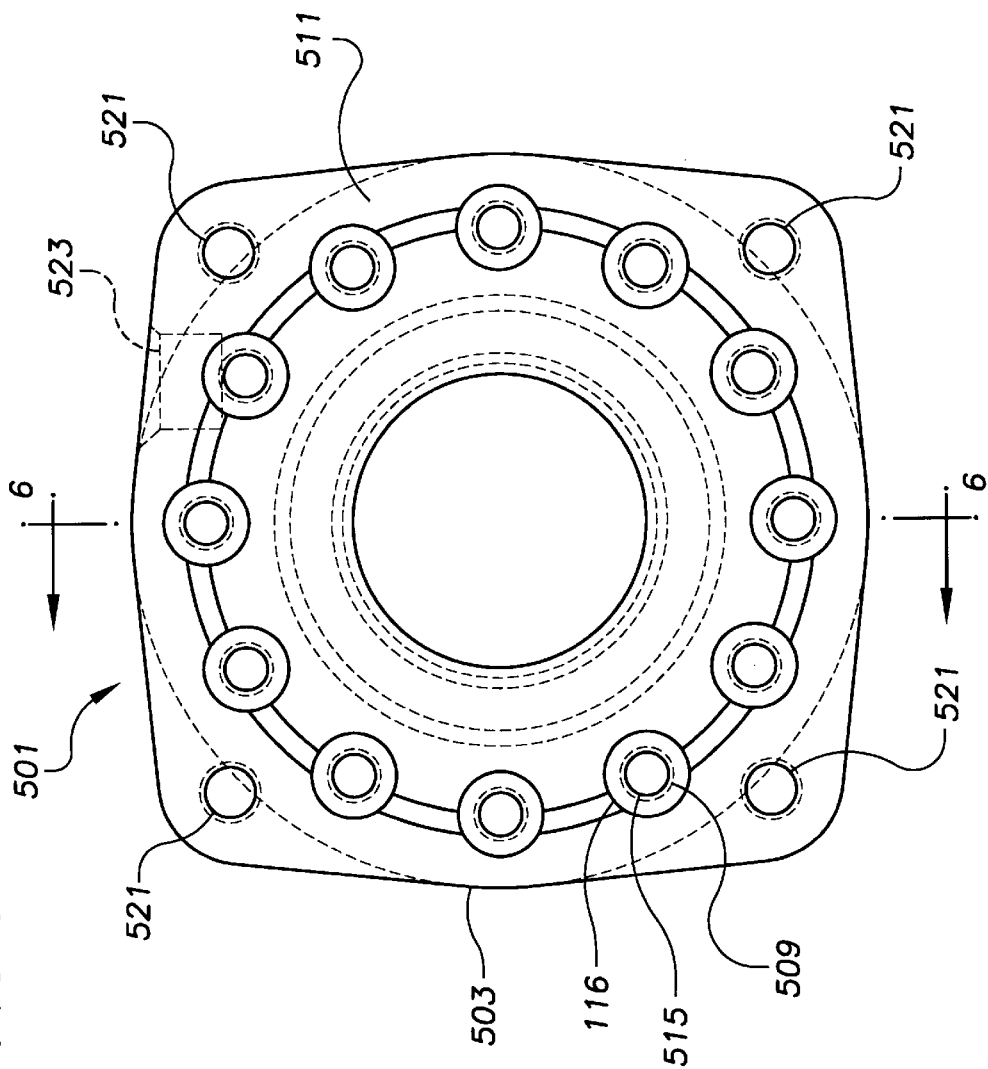
FIG. 5 is an elevation drawing of an alternative embodiment 501 of the adapter looking towards the driven unit end and showing alternate seal arrangements for the PTO fastener holes.

FIG. 5 is an elevation drawing of an alternative embodiment of the adapter 501 looking at the driven unit end. FIG. 6 is a cross-section drawing of adapter 501 taken along lines 6—6 of FIG. 5. In this embodiment, all PTO fastener holes 515 of are though-drilled similar to through holes 115A of FIG. 3. PTO fastener 311 provides attachment to PTO unit 303. Lubrication seal surface 116 surrounding holes 515 provide a lubricant seal with seal washer 505. Seal washer 505 also seals the head of fastener 311. Plugs such as threaded pipe plug 507 are inserted into holes 515 that are not used to fasten adapter 501 to PTO 303. The threads of plugs 507 engage threads 509 of holes 515.

Fastener holes 521 provide a fastening means for attaching a driven unit to adapter 501. In the preferred embodiment, fastener holes 521 are threaded. Lubrication port 523 provides an opening between outside of body 503 of adapter 501 and interior chamber 109. Gasket surface 511 provides a seal surface for a gasket (not shown) between adapter 501 and a driven unit. In other embodiments, a seal compound is applied to gasket surface 511.

The adapter may be made of metals such as aluminum, bronze, steel or cast iron. Or, the adapter may be made of polymer materials or composites. Use of a relatively soft material such as aluminum allows sufficient sealing of PTO fastener heads at PTO lubricant seal surface 116 without additional washers or gaskets. Lubricant seal surfaces and shaft seal receiving surfaces may be machined surfaces with a smoothness sufficient to prevent significant external leakage of lubricant. The adapter may be made by machining, casting, or forging or weld fabrication, or a combination of theses methods.

Accordingly the reader will see that the POWER TAKE-OFF UNIT-DRIVEN UNIT ADAPTER WITH SUMP LUBRICATION provides a connection device between a PTO and a driven unit. The device provides the following additional advantages:

The adapter provides lubrication to the shaft coupling between the units;

Low viscosity lubricants provide continuous lubrication regardless of the orientation of the adapter;

The adapter allows orientation during mounting to avoid interferences; and

The adapter increases the life of the PTO unit and the driven unit as well as the coupling.

Although the description above contains many specifications, these should not be construed as limiting the scope of the invention but as merely providing illustrations of some of the presently preferred embodiments of this invention. Thus the scope of the invention should be determined by the appended claims and their legal equivalents, rather than by the examples given.

We claim:

1. An adapter for connecting a power takeoff unit to a driven unit, the adapter comprising:
   a body defining an internal lubrication sump the lubrication sump comprising a first opening on a first end of the body and a second opening on the second end of the body, the body comprising a plurality of power takeoff unit fastening holes within the lubrication sump on the first end of the body for fastening the adapter to the power takeoff unit and a plurality of driven unit fastening holes for fastening the adapter to the driven unit;
   a lubricant port on the body;
   a first lubricant seal surface surrounding an interior end of each of said plurality of power takeoff unit fastening holes to seal the lubrication sump;
   a second lubricant seal surface at the second opening of the body for sealing the second end of the adapter body to the driven unit; and
   a shaft seal receiving surface on the first end of the body for fitting a power takeoff unit shaft seal to the adapter.

2. The adapter of claim 1 wherein at least one of said plurality of power takeoff unit fastener holes are non-through holes.

3. The adapter of claim 1 wherein said body is made of aluminum and said first lubricant seal surface is a machined surface in the aluminum body.

4. The adapter of claim 1 wherein at least one of said plurality of power takeoff fastener holes comprises a plug.

5. The adapter of claim 1 wherein said second lubricant seal surface comprises a seal retaining groove.

6. The adapter of claim 1 comprising at least two oil lubrication ports spaced radially about the first opening to allow filling the internal lurication sump with lubricant regardless of the radial position of the adapter when fastened to the power takeoff unit.

7. An adapter for connecting a power takeoff unit to a driven unit, the adapter comprising:
   a generally cylindrical body defining an internal cavity, the internal cavity comprising a first opening on a first end of the body and a second opening on the second end of the body,
   a plurality of non-through holes on the first end of the body, spaced radially about the first opening, the plurality of non-through holes comprising an open end open to the internal cavity;
   a first lubricant seal surface surrounding said open end of each of said plurality of non-through holes;
   a plurality of driven unit fastening holes on the driven end for fastening the adapter to the driven unit;
   at least two lubricant ports disposed on the body, said at least two lubricant ports open to the internal cavity;
   a second lubricant seal surface on the second end for sealing the second end of the adapter body to the driven unit; and
   a shaft seal receiving surface on the first end of the body for fitting a power takeoff unit shaft seal to the adapter.

* * * * *